United States Patent [19]

Hayashi

[11] Patent Number: 5,850,738

[45] Date of Patent: Dec. 22, 1998

[54] SUPERCHARGING PRESSURE CONTROL DEVICE

[75] Inventor: Takashi Hayashi, Susono, Japan

[73] Assignee: Toyota Jidosha Kabushiki Kaisha, Toyota, Japan

[21] Appl. No.: 773,283

[22] Filed: Dec. 24, 1996

[30] Foreign Application Priority Data

Dec. 28, 1995 [JP] Japan ................................. 7-343899

[51] Int. Cl.⁶ ................................................ F02B 37/12
[52] U.S. Cl. ................................................ 60/602
[58] Field of Search ...................... 60/600–603; 123/564

[56] References Cited

U.S. PATENT DOCUMENTS 5,440,879  8/1995  Dellora ..................................... 60/602

FOREIGN PATENT DOCUMENTS

A-60-40729  3/1985  Japan .
A-5-106458  4/1993  Japan .
A-5-280364  10/1993  Japan .
5-280365  10/1993  Japan ........................................ 60/602

Primary Examiner—Michael Koczo
Attorney, Agent, or Firm—Oliff & Berridge, PLC

[57] ABSTRACT

According to the supercharging pressure control device of the present invention, the speed of the turbocharger 10 of an internal combustion engine 1 for aircraft is controlled by adjusting the opening of a wastegate valve 26. The control device of the internal combustion engine detects the outlet air pressure of the turbocharger compressor 16 and the turbocharger speed, and based on these values switches between PD control for maintaining the outlet air pressure constant and NT control for maintaining the turbocharger speed constant. That is, if the compressor outlet pressure exceeds a reference value during PD control, NT control is started, while if the compressor outlet pressure exceeds a reference value during NT control, the PD control is started. This enables a drop in the speed of the supercharger to be suppressed and the engine to be operated using its performance to the full extent regardless of changes in atmospheric pressure.

4 Claims, 8 Drawing Sheets

SUPERCHARGING PRESSURE CONTROL DEVICE

BACKGROUND OF THE INVENTION

1. Field of the Invention

The present invention relates to a supercharging pressure control device for a supercharger.

2. Description of the Related Art

In general, in an internal combustion engine equipped with a supercharger, the supercharging pressure is controlled so as to prevent a fall in the supercharging pressure due to a change in the inlet air conditions of the compressor of the supercharger and to thereby enable the performance of the engine to be utilized to the maximum extent. A supercharging pressure control device of this type is disclosed, for example, in Japanese Unexamined Patent Publication (Kokai) No. 60-40729.

The device of this publication is directed to prevent the engine supercharging pressure from falling due to a fall in the atmospheric pressure when the internal combustion engine provided with an exhaust gas turbocharger is operated at a high altitude. It provides detecting means for detecting the absolute pressure of a supercharging pressure and controls the degree of opening of the wastegate valve so that the supercharging pressure becomes constant. That is, the supercharging pressure control device of this publication causes the opening of the wastegate valve to change so as to cause the amount of exhaust gas flowing into the turbocharger to change and thereby maintain the supercharging pressure at a constant value regardless of a change of the atmospheric pressure due to a change in altitude. By controlling the supercharging pressure in this way, the supercharging pressure is maintained at a constant value even when the engine is operated at a high altitude and therefore a deterioration in the engine performance at a high altitude is prevented.

However, problems sometimes arise when the compressor outlet air pressure (supercharging pressure) is maintained at a constant value regardless of the change in the atmospheric pressure such as with the device of the above Japanese Unexamined Patent Publication (Kokai) No. 60-40729.

In general, in order to increase the ratio between the outlet air pressure and inlet air pressure of a turbocharger compressor (hereinafter referred to as "pressure ratio"), it is necessary to increase the speed of the turbocharger. Therefore, when performing control to maintain the outlet air pressure of the compressor at a constant value as in the device of the above publication, it is necessary to increase the speed of the turbocharger and increase the pressure ratio when the compressor inlet pressure (atmospheric pressure) becomes lower. Thus, if the engine is operated in an extremely broad range of altitude such as with a supercharged engine for an aircraft etc., if the supercharging pressure is maintained constant, the speed of the supercharger will end up rising over the maximum allowable speed at some altitudes and a problem of a decline in the durability of the supercharger will occur.

On the other hand, the above problem may be solved if the target value of the control of the supercharging pressure is set to a pressure so that the speed of the supercharger will not exceed the maximum allowable speed even at the maximum altitude at which the engine is operated, but if the supercharging pressure is set low in this way, the engine performance cannot be utilized to the maximum extent at a lower altitude where the engine could inherently be operated with a higher supercharging pressure.

SUMMARY OF THE INVENTION

In view of the problems in the related art as set forth above, the object of the present invention is to provide a supercharging pressure control device which enables operation of an internal combustion engine at the possible highest supercharging pressure at all times and therefore utilizing the engine performance to the maximum extent while preventing the occurrence of excessive speed of the supercharger.

This object is achieved by a supercharging pressure control device, according to the present invention, which comprises a supercharger having a compressor for raising the pressure of air, supercharging pressure detecting means for detecting an outlet air pressure of the compressor, speed detecting means for detecting a speed of the supercharger, first control means for controlling the outlet air pressure of the compressor so that the outlet air pressure detected by the supercharging pressure detecting means becomes a predetermined pressure setting, second control means for controlling a supercharger speed so that the supercharger speed detected by the speed detecting means becomes a predetermined speed setting and selecting means for selectively causing one of the first and second control means to operate based on the detected compressor outlet air pressure and supercharger speed.

According to the present invention, provision is made of first control means for controlling the compressor outlet pressure to a predetermined pressure setting and second control means for controlling the supercharger speed to a predetermined speed setting and selecting means is used to cause one of the first and second control means to operate based on the compressor outlet pressure and supercharger speed. That is, according to the present invention, control can be performed to maintain the compressor outlet pressure at a predetermined pressure setting when the supercharger speed will not exceed a maximum allowable speed and to maintain the supercharger speed at the speed setting when the supercharger speed would exceed the speed setting.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
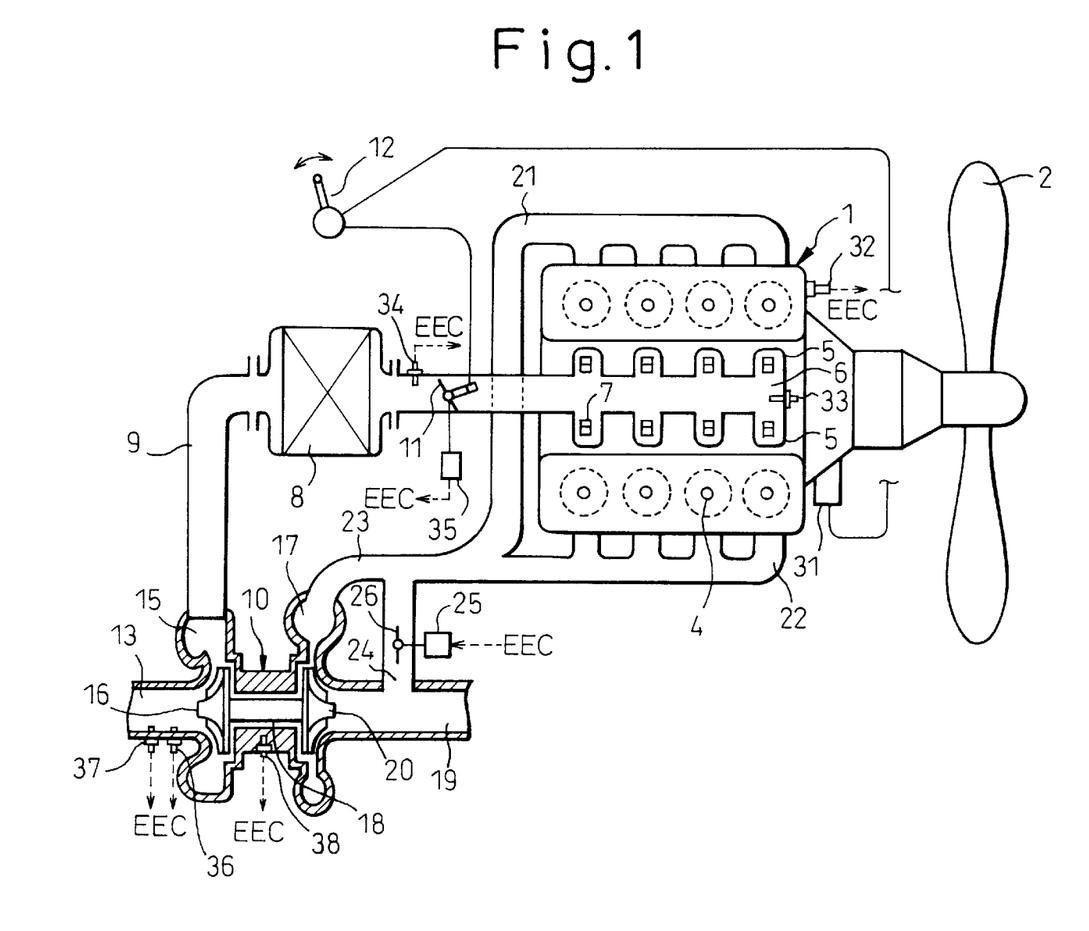
FIG. 1 schematically illustrates the general configuration of an embodiment of the present invention when applied to an aircraft engine.

FIG. 1 is a view of the general configuration of an embodiment of a supercharging pressure control device of the present invention when applied to a supercharged internal combustion engine for an aircraft. In FIG. 1, reference numeral 1 designates an internal combustion engine and 2 designates a propeller driven by the engine 1. In this embodiment, a multi-cylinder (in FIG. 1, a V type 8-cylinder) 4-cycle reciprocating engine is used for the engine 1. The reference numeral 5 in FIG. 1 designates an intake manifold connecting the intake ports of the cylinders of the engine 1 to a common intake duct 6. Near the connecting portions of the intake ports of the cylinders of the intake manifold are arranged fuel injectors 7 for injecting pressurized fuel to the intake ports of the cylinders.

In FIG. 1, 11 shows a throttle valve arranged in the intake duct 6 downstream of an intercooler 8. The throttle valve 11 is connected to a power lever 12 provided at the pilot's seat and assumes a degree of opening according to the amount of operation of the power lever 12. Further, 8 shows the intercooler provided on the intake duct 6, 10 an exhaust turbocharger, and 9 an intake duct connecting the discharge port 15 of a compressor 16 of the turbocharger 10 and the intercooler 8.

Further, in FIG. 1, reference numerals 21 and 22 show intake manifolds connecting the exhaust ports of the cylinders of the banks at the two sides of the engine 1 with a common exhaust pipe 23. The common exhaust pipe 23 is connected to the exhaust inlet 17 of the exhaust turbine 20 of the turbocharger 10.

The turbocharger 10 in this embodiment is comprised of a radial compressor 16 and a radial exhaust turbine 20 for driving the compressor 16. The intake air of the engine 1 flows from the air cleaner (not shown) through the intake inlet pipe 13 to the compressor 16. In the compressor 16, the air is raised in pressure to become supercharged air and is supplied to the intercooler 8 from the intake duct 9. After being cooled at the intercooler 8, it passes through the intake duct 6, throttle valve 11, and intake manifold 5 to be supplied to the cylinders of the engine 1.

Further, the exhaust gas of the engine 1 passes from the exhaust manifold 21 and 22 through the exhaust pipe 23 and flows from the exhaust inlet 17 to the turbine 20. This exhaust gas drives the rotation of the turbine and the compressor 16 connected to the same, then is discharged from the exhaust outlet pipe 19.

Further, in this embodiment, an exhaust bypass passage 24 is provided for connecting the exhaust pipe 23 and the exhaust outlet pipe 19 of the turbine 20. In the exhaust bypass passage 24 is provided a wastegate valve 26 for controlling the flow rate of the exhaust gas bypassing the exhaust turbine 20 from the bypass passage 24 and flowing to the exhaust outlet pipe 19. When the wastegate valve (WGV) 26 is fully closed, the entire amount of the exhaust gas from the engine 1 flows to the turbine 20, so the speed of the turbocharger 10 rises and the outlet pressure of the compressor 16 becomes high (the outlet pressure of the compressor (i.e., the supercharging pressure) is hereinafter referred to as "deck pressure"). On the other hand, when the WGV 26 opens, part of the exhaust gas of the engine 1 bypasses the turbine 20 and flows out to the exhaust outlet pipe 19, so the flow rate of the exhaust gas passing through the turbine 20 drops. Therefore, the speed of the turbocharger 10 falls and the deck pressure falls in accordance with the degree of opening of the WGV 26. That is, by adjusting the degree of opening of the WGV 26, it is possible to make the deck pressure of the engine 1 and the speed of the turbocharger 10 fall to a desired level.

In the embodiment of FIG. 1, the WGV 26 is driven by an actuator 25 comprised of a DC servomotor. The actuator 25 operates in accordance with an opening command signal from a later mentioned electrical engine controller (EEC) 30 (FIG. 2) and controls the WGV 26 to a degree of opening in accordance with the opening command signal from the EEC 30. Note that as the actuator 25, it is also possible to use an actuator other than a DC servomotor so long as it can drive the WGV 26 to the degree of opening in accordance with the opening command signal from the EEC 30. For example, it is also possible to use a stepping motor or an electrical/hydraulic pressure type actuator etc.

In this embodiment, the propeller 2 driven by the engine 1 is a variable pitch propeller, and a speed governor 31 for controlling the propeller pitch of the propeller 2 is provided. In this embodiment, the propeller governor 31 is a centrifugal type governor and is connected to a drive shaft of the propeller through a rotation transmission shaft (not shown). The propeller governor 31 acts to adjust the propeller pitch so that the engine speed (propeller speed) matches the speed setting. That is, when the propeller speed becomes higher than a speed setting, the governor 31 makes the propeller pitch increase and increases the power absorbed by the propeller so as to cause the engine speed to drop. Further, when the propeller speed becomes lower than the speed setting, the governor 31 reduces the propeller pitch and causes the power absorbed by the propeller to decrease so as to cause the engine speed to increase. By this, the propeller speed (engine speed) is controlled to match with the speed setting of the propeller governor 31. In this embodiment, the speed governor 31 and the throttle valve 11 are connected to a common power lever 12 via respective control cables. Therefore, by operating this single power lever 12, it is made possible to simultaneously control both of the degree of opening of the throttle valve 11 (engine output) and the engine speed (pitch of propeller 2). In this embodiment, the control cables for controlling the throttle valve 11 and governor 31 are connected to the power lever through cams having shapes determined in accordance with the aerodynamic characteristics of the aircraft body. Therefore, the characteristics of change of the amounts of operation of the throttle valve 11 and governor 31 with respect to the amount of operation of the power lever 12 can be set to suitable characteristics to provide the optimal engine output/speed characteristics matching with the aerodynamic characteristics of the aircraft body.

Figure 2:
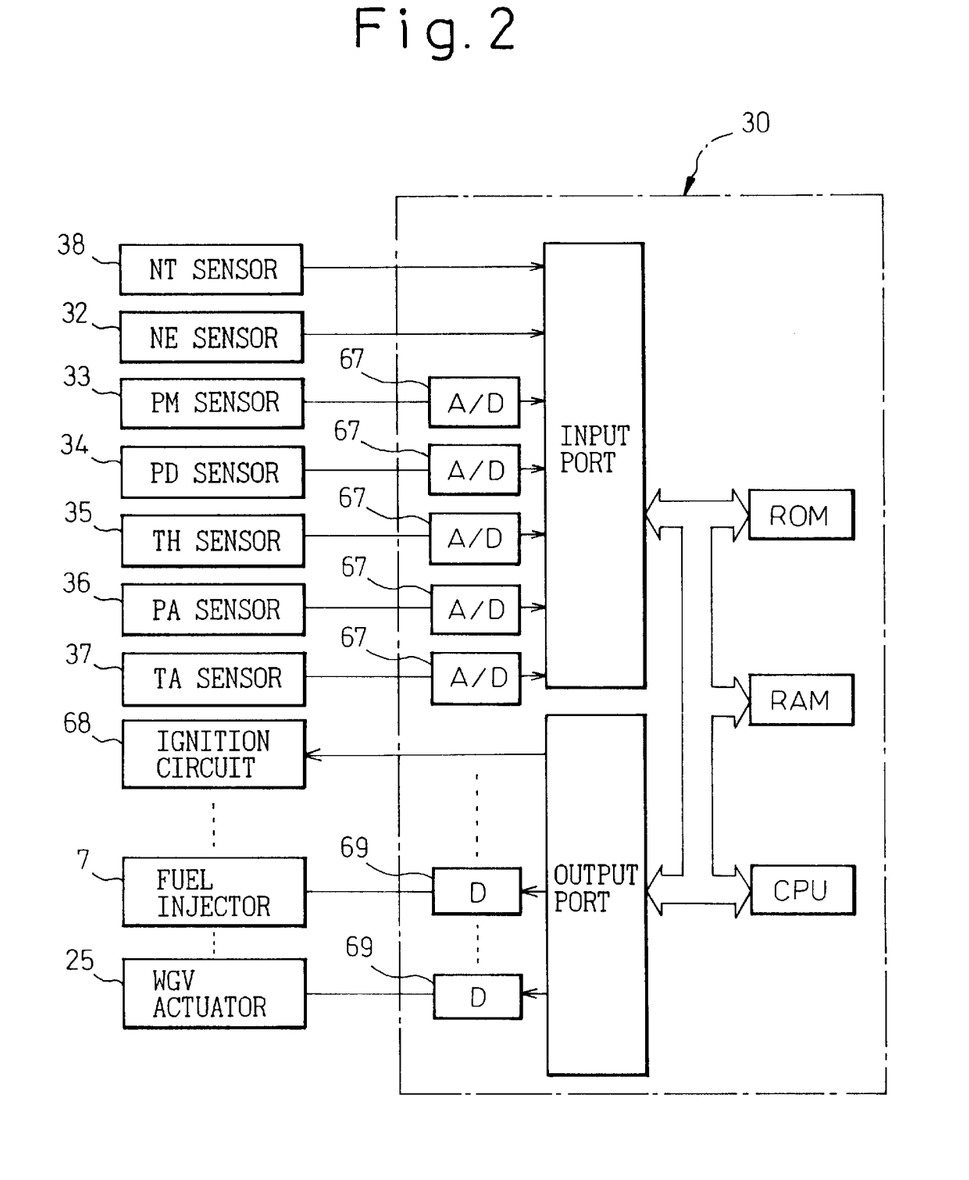
FIG. 2 is a block diagram showing the general configuration of a control device of the embodiment of FIG. 1.

FIG. 2 is a view of the configuration of the EEC (electrical engine controller) 30 for controlling the engine 1. As shown in FIG. 2, the EEC 30 in this embodiment is comprised of a microcomputer of a known configuration including a RAM, ROM, CPU, input port, and output port connected with each other by a bi-directional bus. In this embodiment, the EEC 30 performs the control of the fuel injection of the engine 1, the control of the ignition timing, and other basic controls, and also the later mentioned supercharging pressure control. For these controls, pulse signals having frequencies proportional to the engine speed NE and the turbocharger speed NT are supplied to the input port of the EEC 30 from an NE sensor 32 provided on a crankshaft (not shown) of the engine 1 and an NT sensor 38 provided on a driving shaft 18 connecting the compressor 16 to the turbine 18. The CPU of the EEC 30 calculates the engine speed NE and the turbocharger speed NT based on these pulse signals and uses these speeds for the various control operations mentioned later.

Further, a voltage signal from a PM sensor 33 disposed in the intake duct 6 downstream of the throttle valve 11 which is proportional to the absolute pressure PM in the intake duct 6, and a voltage signal from a PD sensor 34 provided in the intake duct 6 upstream of the throttle valve 11 which is proportional to the supercharging pressure (deck pressure) PD (absolute pressure) of the turbocharger 10 are fed to the input port of the EEC 30 through the AD converters 67. Further, the input port of the EEC 30 receives, as input through the AD converters 67, a voltage signal corresponding to the degree of opening TH of the throttle valve 11 from a TH sensor 35, a voltage signal corresponding to the atmospheric temperature TA from the TA sensor 37, and a voltage signal corresponding to the atmospheric pressure PA from a PA sensor 36.

The output port of the EEC 30 is connected to the spark plugs 4 and fuel injectors 7 of the cylinders of the engine 1 through an ignition circuit 68 and drive circuit 69 and controls ignition timing of the engine 1 and the amount and timing of fuel injection. In this embodiment, the EEC 30 determines the optimal fuel injection amount, injection timing, and ignition timing from the intake pressure PM and engine speed NE detected by the PM sensor 33 and NE sensor 32 based on a numerical table stored in the ROM of EEC 30 in advance. Then, the EEC 30 injects fuel from the fuel injectors 7 and energizes spark plugs 4 in accordance with the determined values.

Further, the output port of the EEC 30 is connected to an actuator 25 of the WGV 26 through the drive circuit 69 and controls the degree of opening of the WGV 26 to control the supercharging pressure as explained below.

Next, the supercharging pressure control performed in the embodiment of FIG. 1 will be explained. However, before explaining a detail of the supercharging pressure control in this embodiment, the object of the supercharging pressure control in this embodiment will be explained using FIG. 3.

Figure 3A:
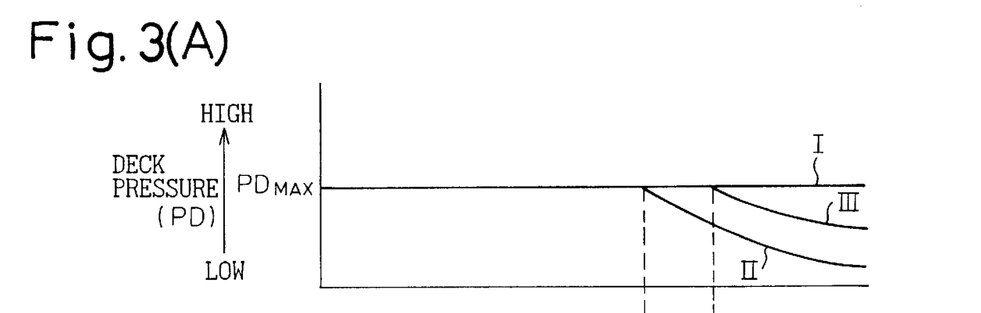
FIGS. 3(A), 3(B) and 3(C) are diagrams explaining the change in the turbocharger speed and supercharging pressure due to the flying altitude when controlling the pressure ratio of the turbocharger to a constant value.
Figure 3B:
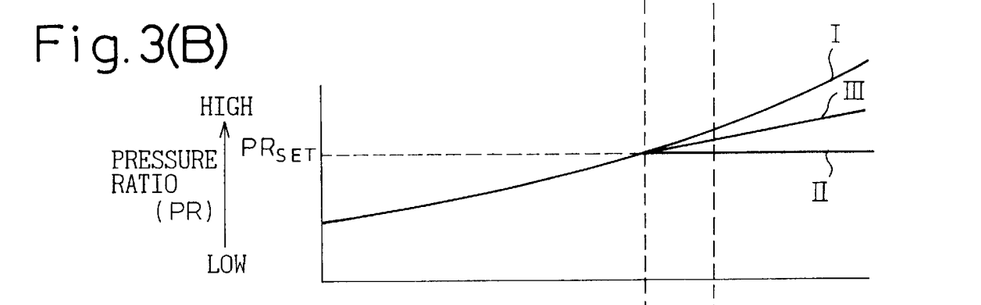
Figure 3C:
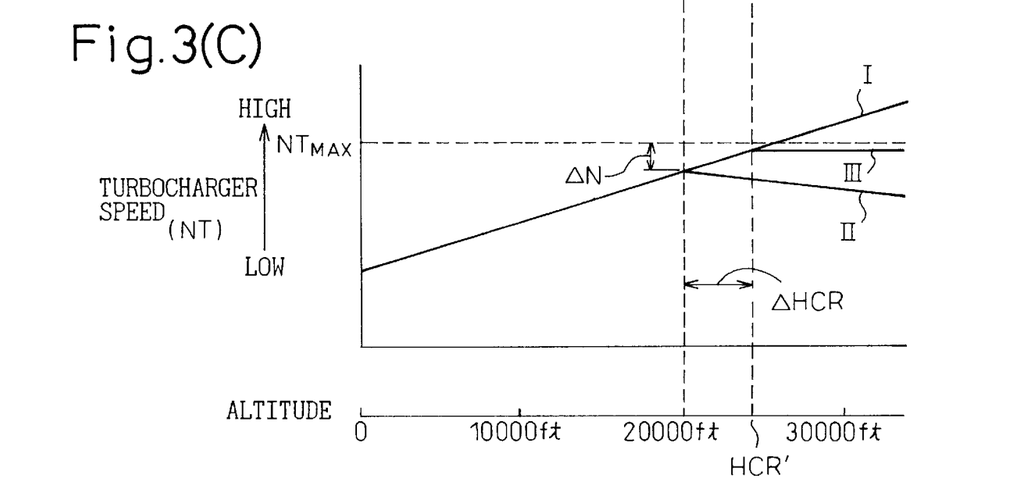

FIGS. 3(A), 3(B) and 3(C) are diagrams showing the change in the operating condition of the turbocharger due to altitude in the case of controlling the deck pressure to a constant level at all times as in the aforementioned prior art. FIGS. 3(A), 3(B), and 3(C) show the changes in the deck pressure PD, the pressure ratio PR between the outlet air pressure and inlet air pressure of the turbocharger compressor (PR=PD/PA), and the turbocharger speed NT, respectively. As shown by the curve I in FIG. 3(A), when PD is controlled to the constant value $PD_{MAX}$ regardless of the altitude, when the altitude increases, the fall in the atmospheric pressure PA causes the pressure ratio PR of the compressor to rise evenly (FIG. 3(B), the curve I). In this case, as shown by the curve I in FIG. 3(C), the turbocharger speed NT also rises evenly in accordance with the pressure ratio PR and over a certain altitude ends up exceeding the maximum allowable speed $NT_{MAX}$ Of the turbocharger.

Usually, the pressure $PD_{MAX}$ of FIG. 3 (A) is set at the maximum allowable deck pressure determined from the durability of the engine 1 etc., and the maximum output of the engine 1 can be obtained under conditions where the deck pressure PD is controlled to $PD_{MAX}$. However, if the deck pressure PD is fixed to $PD_{MAX}$, above a certain altitude (for example, about 24000 feet≅7000 m in FIG. 3(C)), the speed NT of the turbocharger 10 would end up exceeding the maximum allowable speed $NT_{MAX}$, so it becomes necessary to reduce the speed to protect the turbocharger. That is, above a certain altitude, it is not possible to raise the deck pressure PD up to the maximum allowable deck pressure $PD_{MAX}$. Therefore, above this altitude, the maximum output of the engine 1 cannot be obtained. In this way, there is an upper limit of the altitude at which the maximum output can be generated in a supercharged engine of an aircraft. This upper limit of the altitude is called the "critical altitude" and is an altitude determined by the maximum allowable speed $NT_{MAX}$ of the turbocharger 10 (for example, in the example of the curve I in FIG. 3(C), the critical altitude is about 24,000 feet).

Therefore, when the flying altitude of the aircraft is over the critical altitude, it is not possible to perform control with the deck pressure fixed to a constant value and an other control becomes necessary.

The curves II in FIG. 3(A) to 3(C) show the case of solving the above problem by, for example, controlling the deck pressure to a constant value $PD_{MAX}$ at less than the critical altitude and controlling the pressure ratio PR of the compressor to become constant at above the critical altitude. In this case, since the pressure ratio PR=PD/PA is fixed to the constant value $PR_{SET}$ at above the critical altitude as shown by the curve II in FIG. 3(B) (in this case, since the margin ΔN is required as explained later, the actual critical altitude becomes about 20000 ft), if the altitude increases and the atmospheric pressure PA falls, the deck pressure PD will fall in accordance with it (the curve II in FIG. 3. 3(A)). Further, if control is performed to fix the pressure ratio to a constant value in this way, the turbocharger speed will also fall along with the altitude as shown by the curve II in FIG. 3(C).

Figure 4:
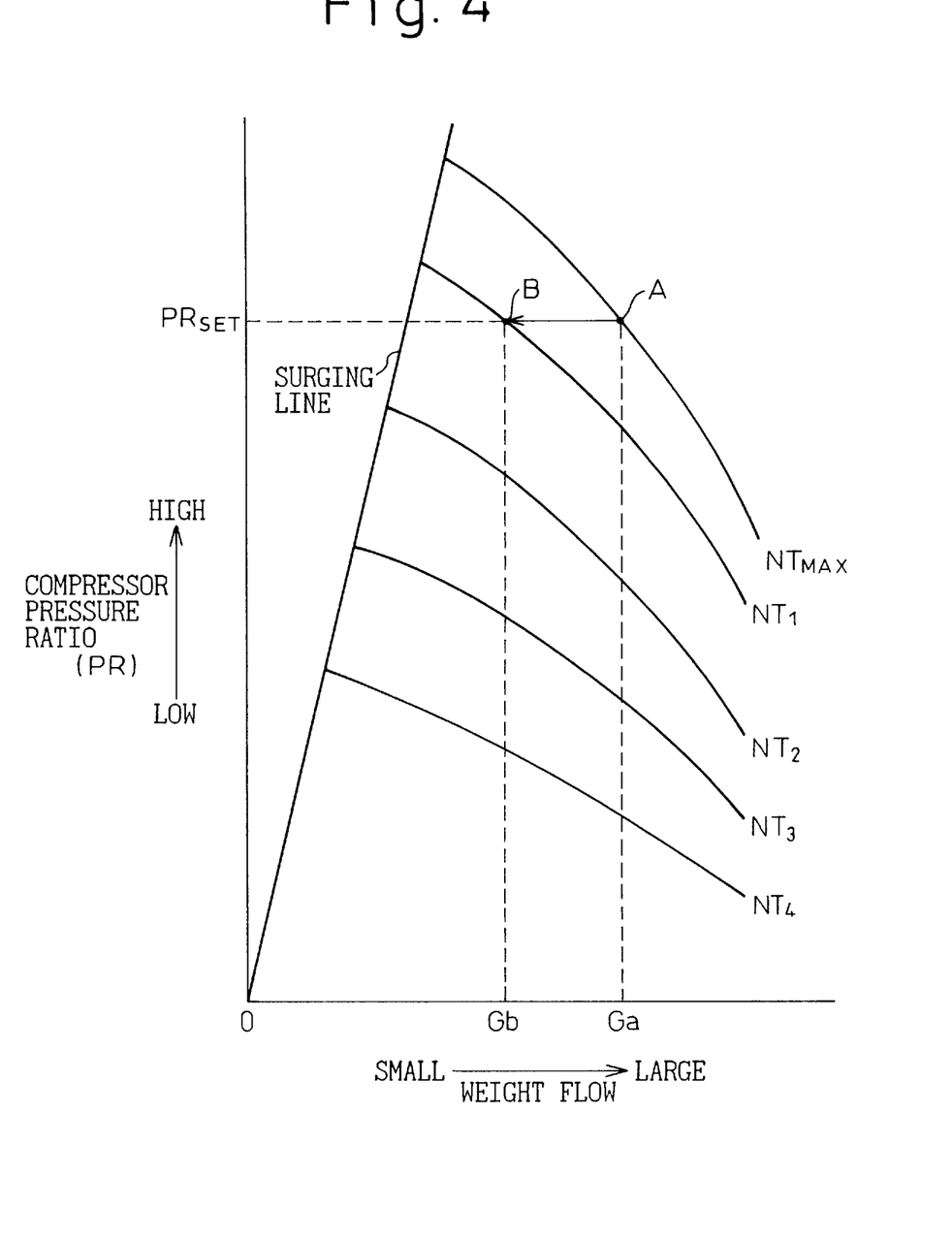
FIG. 4 shows the general performance curves of a turbocharger compressor.

The reason why the turbocharger speed falls along with the altitude when the pressure ratio PR is controlled to a constant level in this way is as follows:

FIG. 4 shows the general performance curves of a turbocharger compressor. In FIG. 4, the vertical axis designates the pressure ratio PR of the compressor (PR=PD/PA) and the horizontal axis the weight flow rate (gram/second) of the compressor inlet air. The curves in the figure are the performance curves for different speeds of the turbocharger. In the figure, the curve shown by $NT_{MAX}$ shows the performance curve in the case of maximum allowable speed of the turbocharger, while $NT_1, NT_2, NT_3 \ldots$ show those of speeds successively lower from the maximum allowable speed. As shown in FIG. 4, when the speed NT is the same, the pressure ratio PR of the compressor increases as the weight flow rate of the intake air becomes lower.

On the other hand, when the compressor inlet air pressure falls, even if the volume flow rate at the compressor inlet conditions is constant, the weight flow rate of the inlet air of the compressor will fall since the density of the inlet air decreases. Therefore, the weight flow rate will fall due to the fall of the inlet air pressure.

Assume that the inlet air conditions of the engine 1 (intake air pipe pressure and temperature) are maintained constant, and the compressor is operated at the point A on the performance curve of FIG. 4 (speed $NT_{MAX}$, flow rate Ga). In this condition, if the inlet air pressure falls with the pressure ratio being held constant, the compressor weight flow rate falls to Gb and, thereby, the operating point shifts on the constant pressure ratio line ($P_{SET}$) to the left direction of the figure along with a fall in the compressor weight flow rate, for example, shifts to the point B of FIG. 4 (speed $NT_1$, flow rate Gb) Therefore, the operating speed of the turbocharger falls from $NT_{MAX}$ to $NT_1$. That is, when the conditions of the inlet air of the engine are constant, if the engine is operated under the constant pressure ratio condition, the speed of the turbocharger will fall along with an increase in the altitude (along with the fall in the atmospheric pressure).

Further, the relationship between the pressure ratio of the compressor and speed is affected by the atmospheric temperature, amount of intake air of the engine, etc. in addition to the atmospheric pressure. Even when the pressure ratio is the same, the turbocharger speed sometimes changes. Therefore, when controlling the pressure ratio of the compressor to a constant level in the region above the critical altitude, it is necessary to give a margin of safety when determining the setting $PR_{SET}$ of the pressure ratio so that the speed of the turbocharger will not exceed the maximum allowable speed even when the conditions influencing the speed are the worst (conditions where speed rises most). That is, under usual conditions, it is necessary that the turbocharger speed becomes lower than the maximum allowable speed $NT_{MAX}$ by the above margin of safety $\Delta N$ (FIG. 3(C)) when the critical altitude is reached. If the pressure ratio PR is controlled to a constant level at an altitude above the critical altitude, the difference between the maximum allowable speed of the turbocharger and the actual turbocharger speed becomes even larger than $\Delta N$. This difference grows larger the higher the altitude.

This means that despite the fact that the turbocharger speed can actually be increased more and the engine can be operated at a high deck pressure above the critical altitude, the turbocharger ends up being operated at a lower speed than actually necessary and therefore the engine performance and turbocharger performance are not fully utilized.

In this embodiment, by controlling the supercharging pressure as explained below, the turbocharger is operated near the maximum allowable speed $NT_{MAX}$ at all times in the region above the critical altitude as shown by the curve III in FIG. 3(C). Due to this, the supercharging pressure also changes as shown by the curve III in FIG. 3(A). The critical altitude rises compared with when controlling the pressure ratio to a constant level (the curve II) and the supercharging pressure can be maintained at its maximum extent within the range where no excess speed of supercharger occurs at an altitude above the critical altitude.

Figure 5:
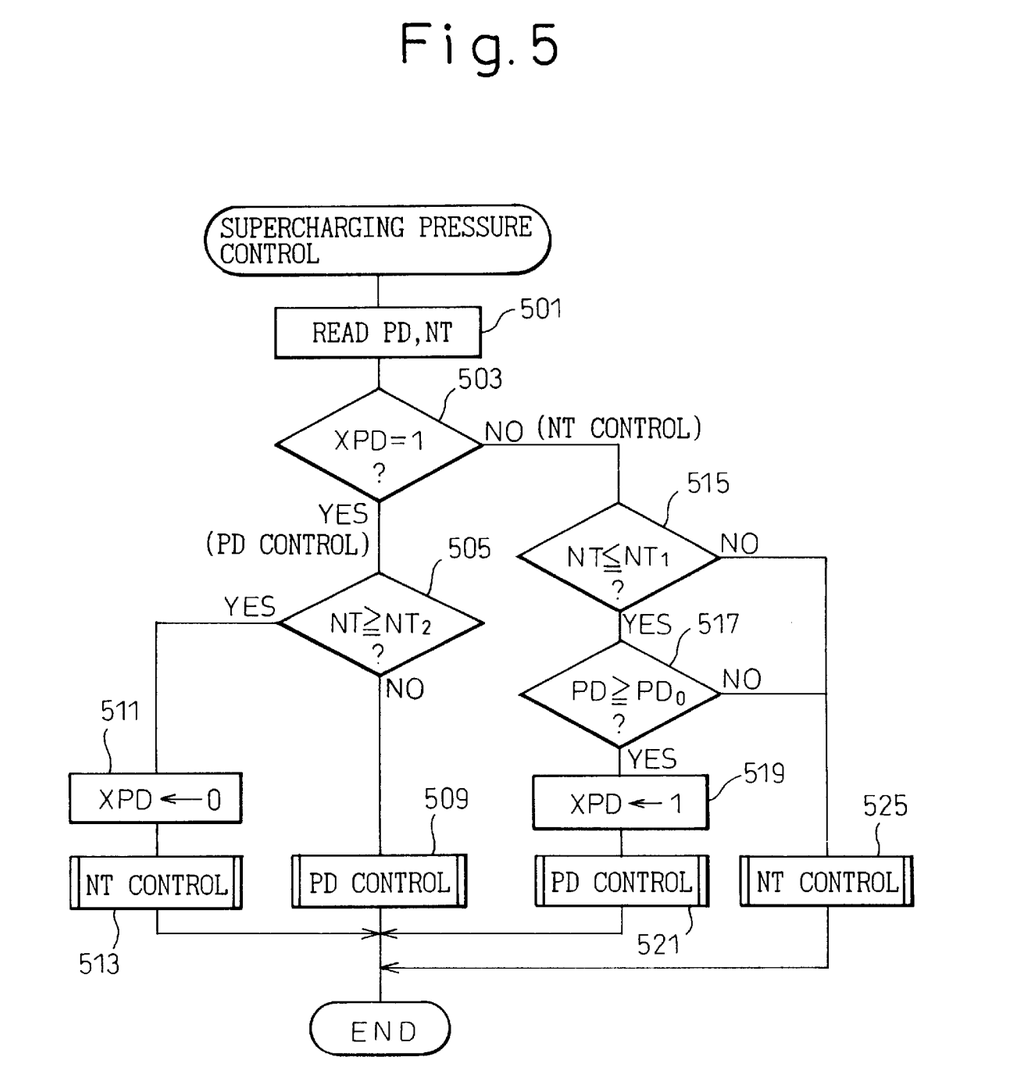
FIGS. 5, 6 and 7 are flowcharts explaining an example of the supercharging pressure control operation according to the present invention.

FIG. 5 is a flow chart for explaining the operation for controlling the supercharging pressure of the present embodiment. This routine is executed by the EEC 30 of FIG. 1 at every predetermined time interval.

In the routine of FIG. 5, an operation is performed to select one of the control for maintaining the deck pressure at a constant value (hereinafter referred to as the "PD control") and the control for maintaining the turbocharger speed at a constant value (hereinafter referred to as the "NT control"). In this embodiment, the selection of the PD control and NT control is performed based on the actually measured deck pressure PD and turbocharger speed NT. That is, in the region lower than a critical altitude and the region where the deck pressure rises, even in a condition where the turbocharger speed NT is relatively low, PD control is performed to maintain the deck pressure at a value near the maximum allowable pressure. If the flying altitude of the aircraft increases in this case, the atmospheric pressure falls, so if PD control is performed, the turbocharger speed NT will increase. In this embodiment, if the turbocharger speed NT rises and reaches the predetermined reference value $NT_1$ during execution of PD control, the PD control is stopped and NT control is started. Due to this, the turbocharger speed NT is then controlled to a value near the maximum allowable speed.

On the other hand, when NT control is being performed and the flying altitude of the aircraft falls, the increase in the atmospheric pressure causes the deck pressure to increase. In this embodiment, if the deck pressure PD exceeds a predetermined reference value $PD_0$ while NT control is being performed, the NT control is stopped and the PD control is started. Due to this, in the low altitude region, the deck pressure will once again be maintained at a value near to the maximum allowable pressure.

When the routine is started in FIG. 5, at step 501, the deck pressure PD and turbocharger speed NT detected by the PD sensor 34 and NT sensor 38 of FIG. 1 are read. Then, at step 503, it is judged if the value of the flag XPD is set to "1". XPD is a flag showing which of the PD control and NT control is currently being executed. XPD=1 means that the PD control is being executed, while XPD=0 means that NT control is being executed. The value of XPD is set at a later mentioned step of this routine.

When XPD=1 at step 503, that is, PD control is currently being executed, the routine proceeds to step 505, where it is judged if the current turbocharger speed NT read at step 501 has become more than the predetermined reference value $NT_2$.

When $NT \geq NT_2$ at step 505, that is, when the turbocharger speed becomes more than the predetermined reference value during execution of PD control, the value of the flag XPD is reset to "0" at step 511 and the NT control of step 513 is performed. Details of this NT control will be explained later. Further, when $NT<NT_2$ at step 505, that is, when the turbocharger speed NT is lower than the predetermined reference value during PD control, step 509 is executed and the PD control continues to be executed without changing the value of the flag XPD (XPD=1). Details of the PD control will be explained later.

On the other hand, when XPD=0 at step 503, that is, when the NT control is currently being performed, it is judged at step 515 if the current turbocharger speed NT is lower than a reference value $NT_1$ separate from $NT_2$. When $NT \leq NT_1$, the routine proceeds to step 517, where it is judged if the current deck pressure PD read at step 501 is higher than a predetermined reference value $PD_0$. Further, when $PD \geq PD_0$ at step 517, the value of the flag XPD is set to "1" at step 519 and PD control is performed at step 521. Further, when either of the conditions of steps 515 and 517 are not true, the NT control is continued (step 525) without changing the value of XPD (XPD=0). Here, the reference value $NT_1$ is a value smaller than $NT_2$.

The reason why the NT control is switched to the PD control only when both of the conditions of $NT \leq NT_1$ (step 515) and $PD \geq PD_0$ (step 517) are true during the execution of the NT control as explained above will now be explained. Namely, if the NT control were to be switched to the PD control (step 521) when the condition that $PD \geq PD_0$ is true in the region of the turbocharger speed NT of $NT_1<NT<NT_2$, the speed NT would rise and end up reaching the reference value $NT_2$ at step 505 and NT control would sometimes restarted at step 513, thereby possibly causing hunting. Therefore, in this embodiment, the NT control is switched to the PD control only when both of the conditions of $NT \leq NT_1$ (step 515) and $PD \geq PD_0$ (step 517) are true when the NT control is executed.

Figure 6:
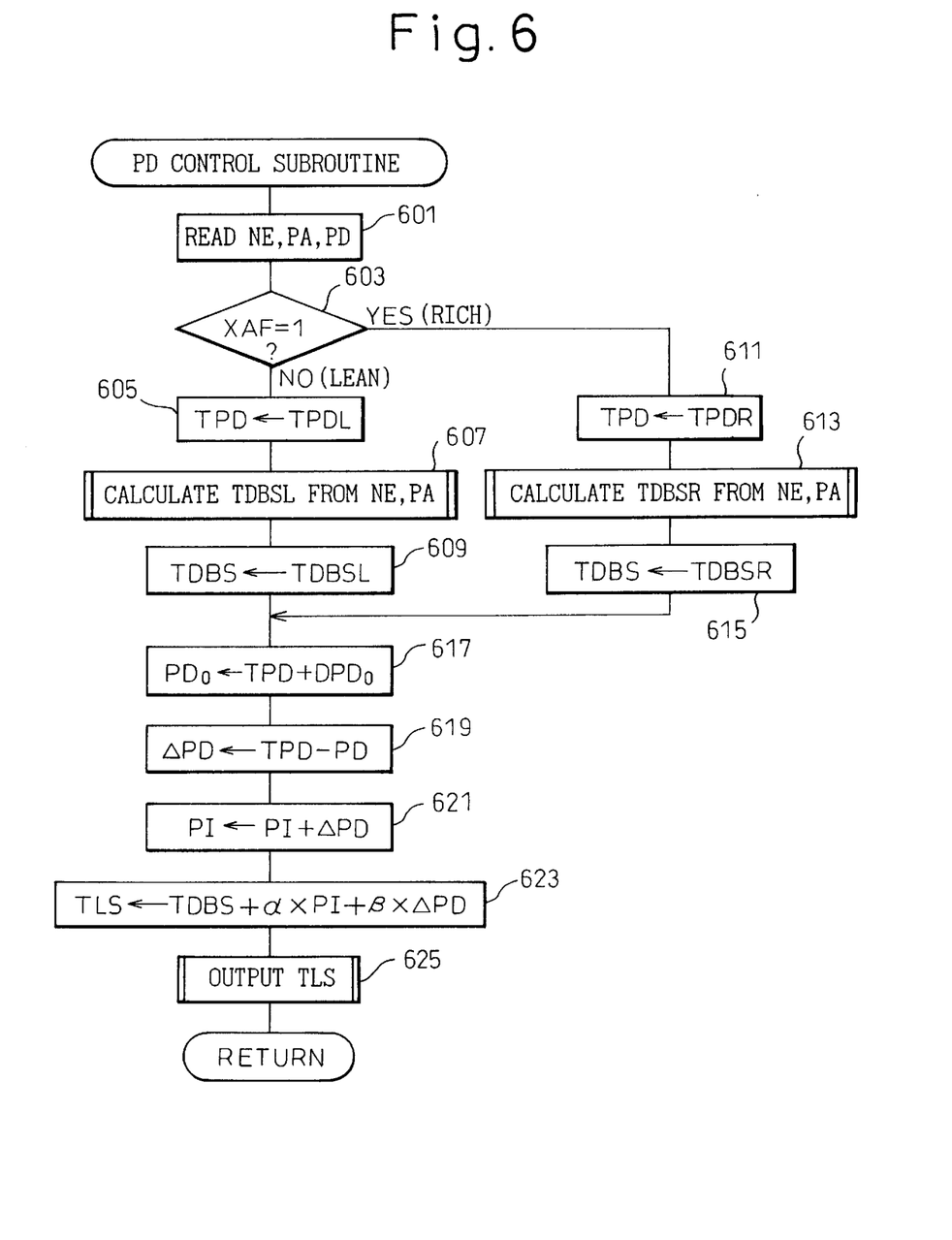

Next, details of the PD control performed at steps 509 and 521 of FIG. 5 will be explained with reference to FIG. 6. FIG. 6 is a flow chart for explaining the PD control operation in this embodiment. This subroutine is executed by the EEC 30 at steps 509 and 521 of FIG. 5.

When the subroutine is started in FIG. 6, at step 601, the speed NE of the engine 1, atmospheric pressure PA, and deck pressure PD are read from the NE sensor 32, PA sensor 36, and PD sensor 34. At step 603, the value of the flag XAF is judged.

The flag XAF is the flag for judging if the engine 1 is currently being operated with a lean air-fuel ratio or is being operated with a rich air-fuel ratio. The value of the flag XAF is set in the routine for calculating the fuel injection amount, not shown, separately executed by the EEC 30, and XAF=1 indicates a rich air-fuel ratio operation, while XAF=0 indicates a lean air-fuel ratio. Usually, when an aircraft engine must give its maximum output, such as during takeoff or landing of the aircraft, the operating air-fuel ratio of the engine (air-fuel ratio of air-fuel mixture in engine combustion chambers) is set to the rich side (excess fuel) from the stoichiometric air-fuel ratio by increasing the fuel supplied to the engine so as to cool the combustion chambers and exhaust system by the fuel and thereby prevent overheating of these elements. Further, when the aircraft is operating in a steady condition, the air-fuel ratio of the engine is set to the lean side from the stoichiometric air-fuel ratio to reduce the fuel consumption and increase the maximum cruising distance. In this embodiment, the control target value TPD of the deck pressure PD is set in accordance with whether the engine is currently operated with a lean air-fuel ratio or a rich air-fuel ratio.

That is, when XAF=0 (lean) at step 603, the control target value TPD of the deck pressure is set to the value TPDL for lean operation at step 605, while when XAF=1 (rich), TPD is set to the value TPDR for rich operation at step 611. Here, TPDL and TPDR are predetermined constant values made close to the maximum allowable deck pressure.

Further, at steps 607 and 609, the basic value TDBS (feed forward value) of the degree of opening of the wastegate valve (WGV) 26 is set from the engine speed NE and the atmospheric pressure PA read at step 601. Here, TDBS is the degree of opening of the WGV 26 required for maintaining the supercharging pressure PD at the control target pressure TPD and is stored in the ROM of the EEC 30 in advance as a three-dimensional map using the atmospheric pressure PA and the engine speed NE.

As explained in FIG. 4, if the speed of the turbocharger 10 is the same, the deck pressure PD becomes larger the higher the atmospheric pressure PA. Further, the engine speed NE roughly corresponds to the air weight flow rate of the compressor 16, so if the other conditions are the same, the deck pressure PD will fall the higher the engine speed NE (air weight flow rate). Therefore, in this embodiment, the engine 1 is operated in a condition of a constant compressor inlet atmospheric temperature while changing the engine speed NE and compressor inlet pressure PA and the basic values TDBS of the degree of opening of the WGV 26 required for maintaining the deck pressure PD at the setting TPD are measured for different values of the NE and PA. The values TDBS are stored in the ROM of the EEC 30 in the form of a numerical map using NE and PA as parameters, and the basic value TDBS is determined based on this map.

Note that in this embodiment, the engine 1 is sometimes operated rich and sometimes operated lean and, further, the setting of TPD differs at the time of lean operation and rich operation. Therefore, in this embodiment, two types of the above TDBS map are also prepared i.e., one for the lean operation and one for the rich operation. In the case when a lean operation of the engine is currently carried out, the basic value of the degree of opening TDBSL for the lean operation is determined using the values of NE and PA from the lean operation map (step 607) and the value of the basic value of the degree of opening TDBS is set to TDBSL (step 609). Similarly, in the case when a rich operation of the engine is currently carried out, the basic value of the degree of opening TDBSR for the rich operation is determined from the rich operation map (step 613) and the value of TDBS is set to TDBSR (step 615).

The basic value TDBS of the degree of opening of the WGV 26 for maintaining the deck pressure PD at the control target value TDP is determined from the operating condition (NE, PA) of the engine 1 in this way.

Further, after the TDBS is set as explained above, at step 617, the deck pressure reference value $PD_0$ of step 517 of FIG. 5 is set as $PD_0=TPD+DPD_0$. Here, $DPD_0$ is a constant value. For example, $DPD_0$ is made a value of about 100 mmHg (about $1.3 \times 10^4$ Pa).

Steps 619 and 621 show the calculation of the feedback amount based on the difference between the actual deck pressure PD and the control target value TPD. In this embodiment, the degree of opening of the WGV 26 is determined by the feed forward amount TDBS set at steps 607 and 609 and steps 613 and 615 and the feedback amount calculated at steps 619 and 621. The above feed forward amount (basic value) TDBS is the degree of opening of the WGV 26 for maintaining the deck pressure PD at the control target value TPD when the engine 1 is being operated in the standard condition. When the engine operating condition deviates from the standard condition or when the engine performance changes due to aging, the required degree of opening of the WGV 26 changes slightly from the basic value TDBS. Therefore, in this embodiment, the basic value TDBS is corrected using the feedback amount to make the deck pressure converge at the control target value TPD with a good precision.

That is, at step 619, the difference $\Delta PD$ between the control target deck pressure TPD and the current deck pressure PD is calculated as $\Delta PD=TPD-PD$ and at step 621 the integral PI of the $\Delta PD$ is calculated as $PI=PI+\Delta PD$.

Further, at step 623, the opening command value TLS of the WGV 26 is calculated as the sum of the above feed forward amount and feedback amount as $$TLS=TDBS+\alpha \times PI+\beta \times \alpha PD$$

Here, $\alpha$ and $\beta$ are coefficients of constant values and $\alpha \times PI + \beta \times \Delta PD$ represents a correction value of the degree of opening of the WGV 26.

At step 625, the opening command value TLS of the WGV 26 calculated as explained above is output to the drive circuit of the actuator 25 of the WGV 26 and the subroutine terminates. Due to this, the actuator 25 opens the WGV 26 to the degree of opening according to the opening command value TLS so the deck pressure PD is adjusted to the control target value TPD.

According to the above routine, since the opening command value of the WGV 26 is set as the sum of the feed forward amount (the basic value) determined by the engine operating condition and the feedback amount (the correction value) based on the difference between the control target value and the actual detected value, it is possible to simultaneously achieve an improvement in the response due to the feed forward control (open loop control) and an improvement in the control precision due to the feedback control (in this embodiment, proportional integral control).

Figure 7:
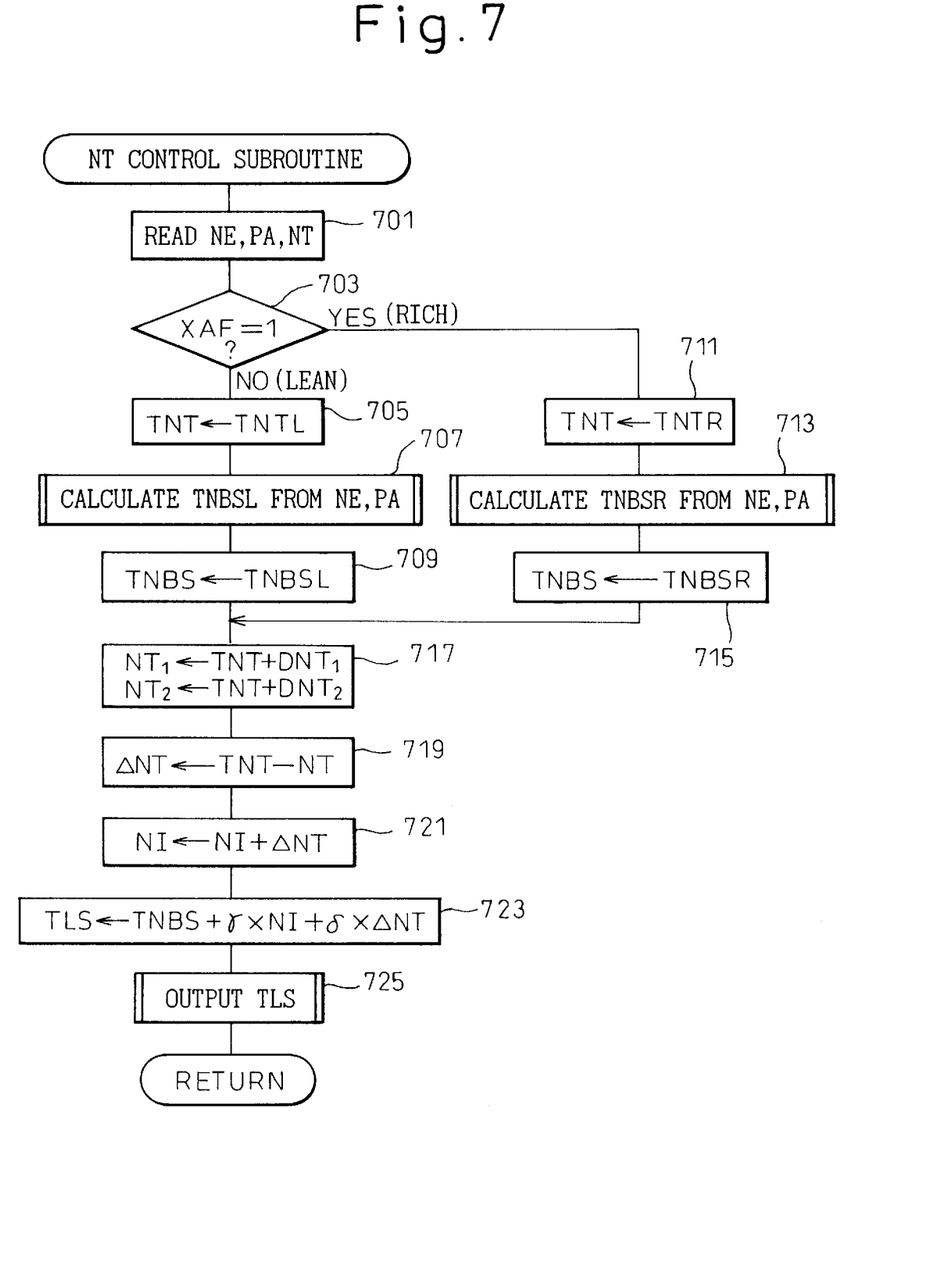

Next, the NT control executed at steps 513 and 525 of FIG. 5 is explained with reference to FIG. 7. FIG. 7 is a flow chart explaining the NT control of this embodiment. The subroutine of FIG. 7 is executed at steps 513 and 525 of the routine of FIG. 5.

In the subroutine of FIG. 7, the opening command value TLS of the WGV 26 is set as the sum of the feed forward amount (the basic value) and the feedback amount (correction value) by a method similar to that of the subroutine of FIG. 6.

That is, from step 701 to 715, the engine speed NE, atmospheric pressure PA, and turbocharger speed NT, detected by the NE sensor 32, PA sensor 36, and NT sensor 38, respectively, are read. From step 703 to 715, the control target speed TNT of the turbocharger 10 and the basic value (feed forward amount) TNBS of the WGV 26 are set in accordance with the current engine operating air-fuel ratio. Here, the TNTL and TNBSL of FIG. 7 represent the control target speed and basic value at the time of an engine lean operation, while the TNTR and TNBSR show the control target speed and basic value at the time of an engine rich operation. TNTL and TNTR are set to values close to the maximum allowable speed of the turbocharger 10.

Further, in this subroutine, the basic value TNBS is decided from a map using NE and PA, but different from that used in the subroutine of FIG. 6. In this embodiment, as in the case of FIG. 6, the openings of the WGV for maintaining the turbocharger speed NT at the control target value TNT are found in advance by experimentally changing the NE and PA to prepare a map of rich operation and lean operation and this map is used to determine the basic opening TNBS in accordance with the engine operating air-fuel ratio.

Further, at step 717, the reference values $NT_1$ and $NT_2$ of the turbocharger speed of steps 505 and 515 in FIG. 5 are calculated as $NT_1 = TNT + DNT_1$ (for example, $DNT_1 \cong 1000$ rpm) and $NT_2 = TNT + DNT_2$ (for example, $DNT_2 \cong 2000$ rpm) using the control target value TNT set as explained above ($DNT_1$, and DNT2 are set to values of 1 to 2 percent of the maximum allowable speed of the turbocharger 10, respectively).

Further, at steps 719 and 721, the difference $\Delta NT$ between the control target value TNT and the actual turbocharger speed NT and the integral NI are calculated as feedback amounts. Further, at step 723, the opening command value TLS of the WGV 26 is calculated as $$TLS = TNBS + \gamma \times NI + \delta \times \Delta NT$$

using the feed forward amount (the basic value TNBS) and feedback amount (the correction value $\delta \times \Delta NT$) where $\gamma$ and $\delta$ are coefficients of constant values. At step 725, the opening command signal TLS is output to the drive circuit. Due to this, even in the case of NT control, it becomes possible to achieve both an excellent response due to the feed forward control and a high control precision due to the feedback control.

Figure 8:
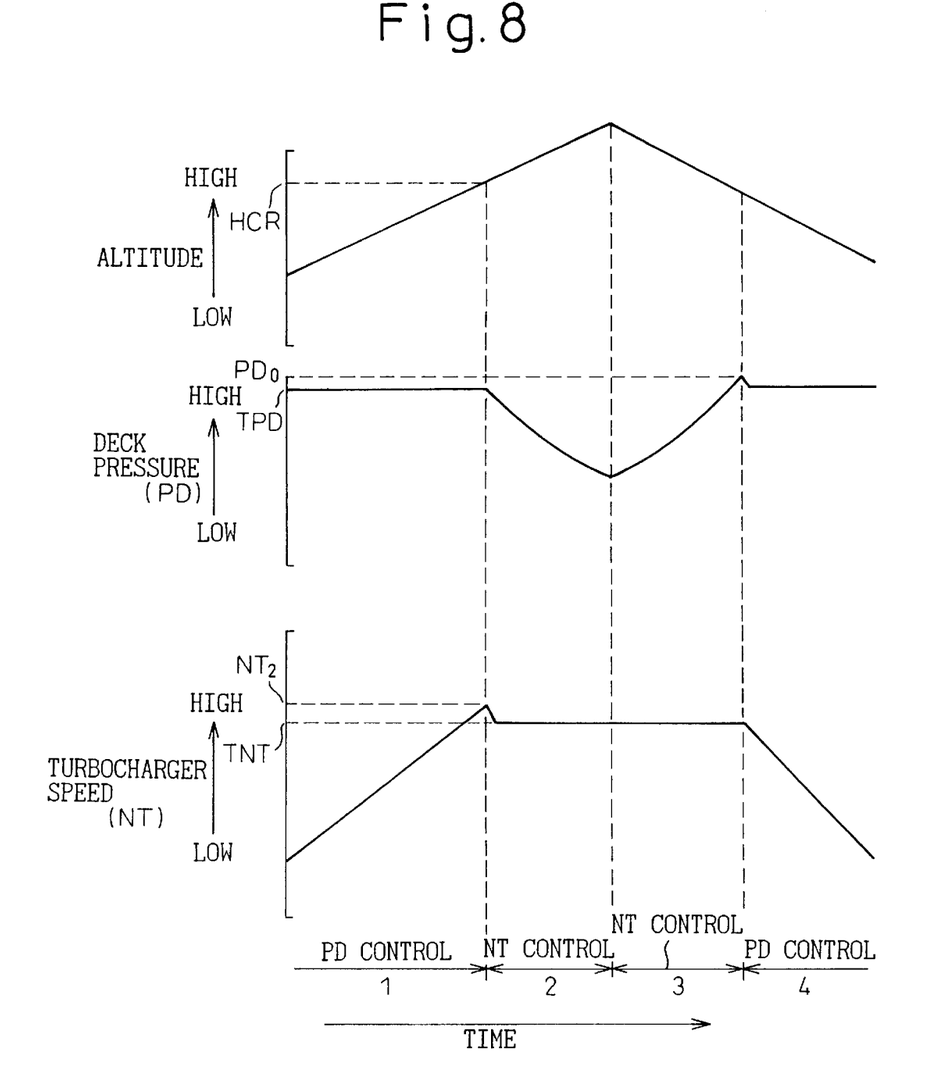
FIG. 8 is a diagram explaining the changes in the turbocharger speed and supercharging pressure according to the flying altitude when the supercharging pressure control operation of FIGS. 5 through 7 is carried out.

FIG. 8 is a diagram showing the changes in the deck pressure (supercharging pressure) PD and turbocharger speed TN due to altitude during actual operation when the supercharging pressure is controlled by the embodiment explained from FIG. 5 to FIG. 7.

FIG. 8 shows the changes in the PD and NT in the case where the aircraft rises and then descends once again. For example, during ascent of the aircraft, before the critical altitude (shown by HCR in FIG. 8) is reached, the PD is controlled so that the supercharging pressure is maintained constant at the control target value TPD near the maximum allowable deck pressure (FIG. 8, zone 1). Further, in this zone, the turbocharger speed NT rises along with the altitude. When the critical altitude is reached, NT also reaches the reference value $NT_2$. Due to this, the PD control is stopped and NT control is started (FIG. 8, zones 2 and 3). In these zones, the turbocharger speed NT is maintained at a constant speed TNT lower than $NT_2$. Therefore, if the aircraft continues ascending, the deck pressure PD will gradually fall (FIG. 8, zone 2). Further, if the aircraft descends in this condition (FIG. 8, zone 3), the deck pressure will gradually rise and will reach the reference value $PD_0$ near the critical altitude HCR. Due to this, the NT control is stopped and the PD control is resumed (FIG. 8, zone 4) and therefore the deck pressure PD is controlled constant to the control target value TPD near the maximum allowable deck pressure.

Next, the effects of the control of the supercharging pressure in this embodiment will be explained referring once again to FIG. 3. In this embodiment, since the turbocharger speed NT is detected and that the speed NT is directly controlled above a critical altitude, there is no need to set a large margin of safety ($\Delta N$) with respect to the maximum allowable pressure as shown in FIG. 3(C). Therefore, in the region near the critical altitude (the region shown by AHCR in FIG. 3), it is possible to increase the turbocharger speed (the curve III in FIG. 3(C)) from that of the past (the curve II in FIG. 3(C)). Due to this, with the control of this embodiment, it becomes possible to maintain the maximum deck pressure up to an altitude higher than the past (the curve II in FIG. 3(A)) (that is up to the altitude shown by HCR' in FIG. 3) and therefore the real critical altitude becomes higher than in the past. Further, in the region above the critical altitude, since the turbocharger speed is maintained higher than the conventional case (the curve II in FIG. 3(C)) at all times (the curve III in FIG. 3(C)), the deck pressure (the curve III in FIG. 3(A)) also becomes higher than the past (the curve II in FIG. 3(A)). Therefore, it becomes possible to utilize the performance of the engine to the maximum extent at altitudes where it could not be utilized in the past.

I claim:

1. A supercharging pressure control device comprising:
    a supercharger having a compressor for raising the pressure of air;
    supercharging pressure detecting means for detecting an outlet air pressure of said compressor;
    speed detecting means for detecting a speed of said supercharger;
    first control means for controlling the outlet air pressure of said compressor so that the outlet air pressure detected by said supercharging pressure detecting means becomes a predetermined pressure setting;
    second control means for controlling a supercharger speed so that the supercharger speed detected by said speed detecting means becomes a predetermined speed setting; and
    selecting means for selectively causing one of said first and second control means to operate based on said detected compressor outlet air pressure and supercharger speed.

2. A supercharging pressure control device as set forth in claim 1, wherein said selecting means is provided with:
    first switching means for stopping the operation of said first control means and causing said second control means to operate when said supercharger speed becomes higher than a predetermined reference value during the operation of the first control means; and
    second switching means for stopping the operation of said second control means and causing said first control means to operate when said compressor outlet air pressure becomes higher than a predetermined reference value during the operation of the second control means.

3. A supercharging pressure control device as set forth in claim 1, wherein
    said supercharger is an exhaust gas turbocharger which supercharges an internal combustion engine and said supercharging pressure control device is provided with operating condition detecting means for detecting an engine operating condition parameter representing an operating condition of said internal combustion engine, a wastegate valve for causing a flow rate of exhaust gas flowing into the exhaust gas turbocharger to change, and driving means for changing a degree of opening of said wastegate valve in accordance with opening command values set by said first and second control means;

said first control means is provided with first feed forward means for calculating a basic value of the degree of opening of the wastegate valve based on a predetermined relationship from the value of said engine operating condition parameter and said predetermined pressure setting, first feedback means for calculating a correction value of the degree of opening of said wastegate valve in accordance with a difference between said predetermined pressure setting and a compressor outlet air pressure detected by said supercharging pressure detecting means, and opening setting means for setting the opening command value at a sum of the basic value of the degree of opening calculated by the first feed forward means and the correction value of the degree of opening calculated by the first feedback means; and said second control means is provided with second feed forward means for calculating a basic value of the degree of opening of the wastegate valve based on a predetermined relationship from the value of said engine operating condition parameter and said predetermined speed setting, second feedback means for calculating a correction value of the degree of opening of said wastegate valve in accordance with a difference between said predetermined speed setting and a supercharger speed detected by said speed detecting means, and opening setting means for setting the opening command value at a sum of the basic value of the degree of opening calculated by the second feed forward means and the correction value of the degree of opening calculated by the second feedback means.

4. A supercharging pressure control device as set forth in claim 2, wherein said supercharger is an exhaust gas turbocharger which supercharges an internal combustion engine and said supercharging pressure control device is provided with operating condition detecting means for detecting an engine operating condition parameter representing an operating condition of said internal combustion engine, a wastegate valve for causing a flow rate of exhaust gas flowing into the exhaust gas turbocharger to change, and driving means for changing a degree of opening of said wastegate valve in accordance with opening command values set by said first and second control means;

said first control means is provided with first feed forward means for calculating a basic value of the degree of opening of the wastegate valve based on a predetermined relationship from the value of said engine operating condition parameter and said predetermined pressure setting, first feedback means for calculating a correction value of the degree of opening of said wastegate valve in accordance with a difference between said predetermined pressure setting and a compressor outlet air pressure detected by said supercharging pressure detecting means, and opening setting means for setting the opening command value at a sum of the basic value of the degree of opening calculated by the first feed forward means and the correction value of the degree of opening calculated by the first feedback means; and said second control means is provided with second feed forward means for calculating a basic value of the degree of opening of the wastegate valve based on a predetermined relationship from the value of said engine operating condition parameter and said predetermined speed setting, second feedback means for calculating a correction value of the degree of opening of said wastegate valve in accordance with a difference between said predetermined speed setting and a supercharger speed detected by said speed detecting means, and opening setting means for setting the opening command value at a sum of the basic value of the degree of opening calculated by the second feed forward means and the correction value of the degree of opening calculated by the second feedback means.

* * * * *